United States Patent [19]

Walter

[11] Patent Number: 4,764,983
[45] Date of Patent: Aug. 16, 1988

[54] COMMUNICATION LASER ALIGNMENT ASSEMBLY

[75] Inventor: Richard K. Walter, Manheim, Pa.

[73] Assignee: Laser Communications, Inc., Lancaster, Pa.

[21] Appl. No.: 61,553

[22] Filed: Jun. 15, 1987

[51] Int. Cl.⁴ .......................... H04B 9/00; H01S 3/03; H01S 3/08

[52] U.S. Cl. .................................. 455/609; 455/620; 372/65; 372/107

[58] Field of Search ...................... 455/609, 6 B, 620; 372/61, 65, 107, 108, 109

[56] References Cited

U.S. PATENT DOCUMENTS

| | | | |
|---|---|---|---|
| 2,982,859 | 5/1961 | Steinbrecher | 455/617 |
| 3,156,825 | 11/1964 | Lines | 455/606 |
| 3,316,800 | 5/1967 | Kibler | 455/609 |
| 3,404,403 | 10/1968 | Vallese | 455/609 |
| 3,440,563 | 4/1969 | Clement | 372/107 |
| 3,499,713 | 3/1970 | Ito | 455/609 |
| 4,209,689 | 6/1980 | Linford | 455/609 |
| 4,249,265 | 2/1981 | Coester | 455/606 |

FOREIGN PATENT DOCUMENTS 2213105 9/1973 Fed. Rep. of Germany ........ 372/61
2815458 10/1978 Fed. Rep. of Germany ........ 372/65

*Primary Examiner*—Robert L. Griffin
*Assistant Examiner*—Andrew J. Telesz, Jr.
*Attorney, Agent, or Firm*—Martin Fruitman

[57] ABSTRACT

An adjustable positioning plate for aligning a communications laser transmitter or receiver station. The cabinet is anchored to a flat mounting plate by a three point suspension consisting of a ball fulcrum at the cabinet bottom front center and fixtures at the lower rear corners of the cabinet. Each rear fixture includes a horizontal adjustment relative to a block attached to the mounting plate and a vertical screw to furnish vertical adjustment. Four springs straddling the cabinet sides and cross rods across the top hold the cabinet tightly against the three point suspension.

7 Claims, 1 Drawing Sheet

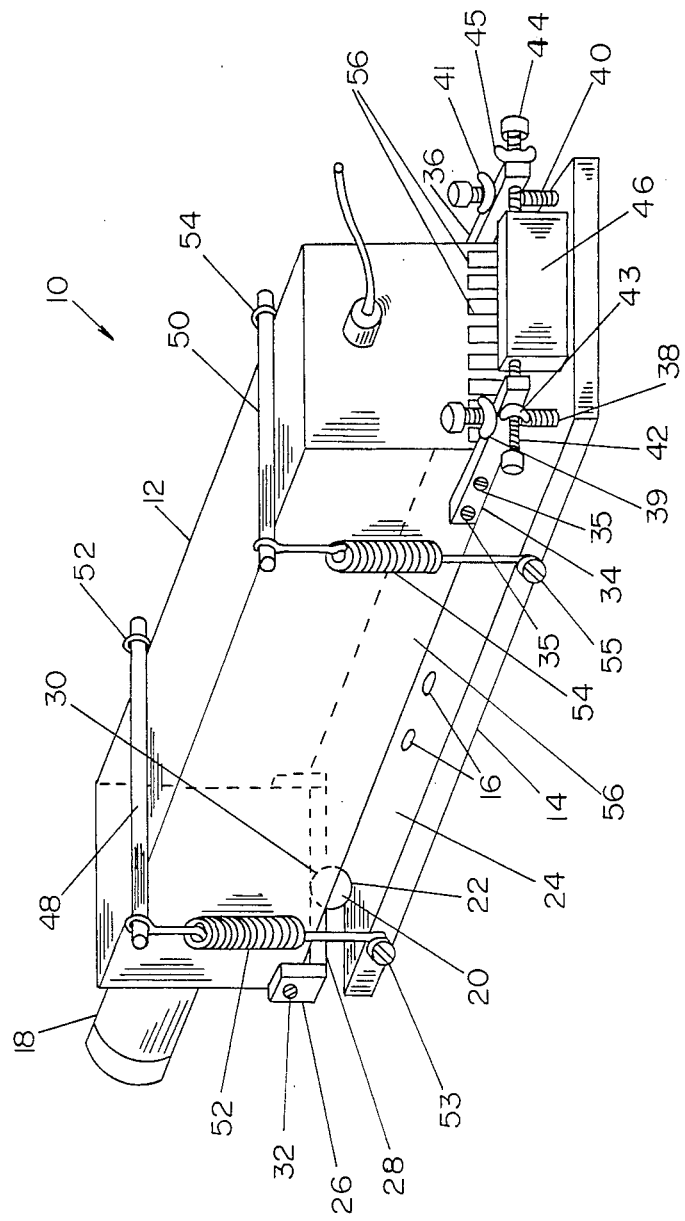

COMMUNICATION LASER ALIGNMENT ASSEMBLY

SUMMARY OF THE INVENTION

This invention deals generally with light wave communications and more specifically with a mounting and alignment system for a laser transmitter or receiver station.

Laser communication systems have many advantages, one of the most important of which is the point to point nature of the transmission path. Since the transmission is specifically directed from one point to another, it can be made highly secure, because interception of the signal requires actual interception of the line of sight path. However, this important advantage brings with it a problem that is unique to laser communications, the need for a highly stable but adjustable mounting arrangement. The mounting arrangement for a communication laser station must fix the station in position so that no inadvertent motion of the station occurs, but it must permit convenient initial alignment of the transmitter with its intended receiver. At typical transmitter to receiver distances of one kilometer, even the very smallest misalignment will cause the laser beam to miss the receiver, and thus prevent operation of the communication link.

The problem of reliable adjustment of a stable mounting arrangement is solved by the present invention with a three point suspension system which holds the cabinet of a laser transmitter or receiver station on a base plate but permits convenient adjustment of the alignment and simple removal of the station if replacement is required.

The mounting and alignment assembly consists essentially of a flat base plate with a dimension at least as large as the bottom surface of the station cabinet. In the top surface of the base plate near the front edge, that is, near the edge nearest to the other transmitter or receiver station, and at the center of the edge, is located a socket in the shape of a partial sphere. At the top rear of the base plate an alignment block is also attached. The front socket is used to capture a hard smooth ball upon which the station cabinet pivots, and fixtures are attached to the lower rear corners of the cabinet to furnish vertical and horizontal adjustments. These fixtures attached to each corner are essentially rectangular cross section rods which extend straight back from the cabinet, and each fixture has one threaded horizontal adjustment hole and one threaded vertical adjustment hole.

Screws are threaded into the vertical adjustment holes with the screw bottom ends resting on the top surface of the base plate. Thus, turning either of the two screws lifts or lowers that rear corner of the cabinet. The horizontal adjustment threaded holes in the fixtures are essentially aligned with the vertical side surfaces of the alignment block so that screws which are threaded into those horizontal adjustment holes extend to and contact the alignment block. Therefore, turning one or the other of the horizontal adjustment screws will move the rear of the cabinet sideways. Lock nuts are added to each of the four screws to permit fixing the location of the screws to prevent undesirable movement.

The top ball socket for pivot action at the front bottom of the cabinet is attached to the cabinet by means of a saddle formed from a horizontal bar with two short vertical bars attached to its end. The vertical bars have holes by which they are attached to the cabinet with screws, and the partial sphere of the ball socket is located on the underside of the center horizontal bar.

Therefore, with the pivot ball in place in its socket on the base plate, the transmitter or receiver station, with its front saddle and rear corner fixtures attached, can be fitted atop the pivot ball and its rear corners will be supported on the base plate by the two vertical adjustment screws threaded into the rear corner fixtures. Horizontal orientation will then be determined by the extension of the horizontal screws in the rear corner fixtures to contact the alignment block.

In order to retain the cabinet in the alignment thus determined, a crossrod and spring arrangement is used to form two retaining yokes, one each at the front and rear of the cabinet. For this purpose, a rod with notched ends is laid crosswise across the top of the cabinet and two springs, each with its bottom end attached to the base plate are stretched and attached to the crossrod at its ends. One such yoke assembly is located near the pivot ball and the other near the rear of the cabinet, so that together they hold the cabinet tightly against the base plate on the rear vertical adjustment screws and the pivot ball.

With the cabinet's rear corner fixtures and front socket saddle all attached to cabinet cooling fins, rather than to the cabinet sides themselves, the present invention attaches to the cabinet without penetrating it, and therefore can be used with a hermetically sealed cabinet without affecting the integrity of the seal.

Therefore, the present alignment assembly can firmly hold a communication laser transmitter or receiver station without affecting its operation or its internal alignment and permit precise alignment, but yet allow ease of replacement. Alignment is, in fact, accomplished by hand turning the screws and installation and removal is also accomplished without tools, so that there is no likelihood of damaging the transmitter or receiver station by misuse of tools.

BRIEF DESCRIPTION OF THE DRAWING

The FIGURE is a perspective view of the preferred embodiment of the invention showing a communication laser station installed on the mounting and alignment assembly.

DETAILED DESCRIPTION OF THE INVENTION

The FIGURE is a perspective view of the preferred embodiment of the invention in which alignment assembly 10 is used to hold laser communication station cabinet 12 in precise alignment with another station (not shown) while permitting adjustment and replacement without tools.

Alignment assembly 10 is assembled upon base plate 14 whose dimensions are at least as large as those of the plan view of cabinet 12 and which can be attached to a stationary surface by using standard fasteners (not shown) through attachment holes 16. Station cabinet 12 is then set atop base plate 14 with a three point support system which permits both vertical and horizontal adjustment. At the front of cabinet 12, where lens 18 is located through which the laser beam passes to or from the station, cabinet 12 pivots upon pivot ball 20 which rests in spherical socket hole 22 in the top surface 24 of base plate 14. Cabinet 12 has saddle 26 attached to its lower surface. Horizontal bar 28 of saddle 26 has spherical top socket 30 located at its approximate center so that cabinet 12 can be pivoted to either side with equal ease. Saddle 26 is attached to the front bottom region of cabinet 12 by screw 32 and a second screw (not shown) on the other side of cabinet 12.

Two other pivot points for cabinet 12 are located near its bottom rear corners. At those locations, fixtures 34 and 36 extending rearward are attached to cabinet 12 by screws 35. In the preferred embodiment, each fixture is essentially a rectangular cross section rod and they contain vertical threaded holes through which height screws 38 and 40 pass. Therefore, with fixtures 34 and 36 firmly attached to cabinet 12 and height screws 38 and 40 threaded through the fixtures and resting on base plate 14, cabinet 12 is supported on three points. Furthermore, turning either or both of height screws 38 and 40 pivots cabinet 12 on pivot ball 20 and varies its parallelism with base plate 14, thus changing the orientation of the laser beam transmitted or received by the station. Once the proper height and tilt of cabinet 12 is attained, winged lock nuts 39 and 41 are tightened and the fidelity of that adjustment is thereby assured.

The horizontal adjustment of cabinet 12 is controlled by horizontal adjustment screws 42 and 44 which are contained in horizontal threaded holes in fixtures 34 and 36 respectively. Horizontal adjustment screws 42 and 44 contact and bear against the vertical surfaces of alignment block 46 which is rigidly attached to base plate 14, thus creating a force against the fixtures. Thus when, for instance, horizontal adjustment screw 44 is turned through fixture 36 and bears against alignment block 46, and providing horizontal alignment screw 42 is loose and not already in contact with alignment block 46, the rear of cabinet 12 will move to the right in the FIGURE.

When the horizontal adjustment is completed, winged lock nuts 43 and 45 on horizontal adjusting screws 42 and 44, respectively, are tightened to assure that the set alignment will remain fixed.

Cross rods 48 and 50 and springs 52 and 54, along with the matching springs on the far side of cabinet 12, are used to hold cabinet 12 firmly in place on base plate 14, even though it is not actually attached to the base plate.

Front set of springs 52 and their crossrod 48 is located near pivot ball 20 and acts to keep pivot ball 20 properly captured. Springs 52 are anchored to base plate 14 by screws 53, and springs 54 are similarly anchored by screws 55. The location of rear crossrod 50 and springs 54 is not critical, but is normally located near the rear end of cabinet 12 for best leverage.

It should also be noted that saddle 26 and fixtures 34 and 36 are located in the preferred embodiment so that their attachment screws do not penetrate into the interior of station cabinet 12. Rather, the screws are attached to cooling fins 56 which protrude from the bottom of cabinet 12. Thus, the attachment of cabinet 12 to alignment assembly 10 permits the preservation of the integrity of the hermetic seal of cabinet 12 and, in fact, creates no distortion in the cabinet which might affect internal structure and alignment of its optical systems.

Perhaps the greatest advantage of the described invention is that all adjustments, and even replacement of station can be accomplished without any tools whatsoever. Both the height adjustment screws 38 and 40 and the horizontal adjustment screws 42 and 44 can be turned by finger motion when their lock nuts are loose, so those adjustments are easily accomplished without tools. Moreover, spring sets 52 and 54 can also be released and attached from their crossrods by hand.

Therefore, removing station cabinet 12 requires loosening horizontal adjusting screws 42 and 44 with one's fingers, after loosening their winged lock nuts 43 and 45. This is done to assure that adjusting screws 42 and 44 do not act as a clamp around alignment block 46. Then springs 52 and 54 are lifted by hand in order to release crossrods 48 and 50, and the station cabinet can be lifted free. Replacement of a new cabinet requires, of course, the reverse procedure.

As can be appreciated, with no tools required, replacement is not only more convenient, but easier on the equipment, since damage is much less likely when adjustments are made by hand.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance, fixtures 34 and 36 could be of different configuration or a pivot point other than a ball could be used.

What is claimed as new and for which Letters Patent of the United States are desired to be secured is:

1. A mounting and alignment assembly for a communication laser station comprising:
   a cabinet for a communication laser station;
   a base plate whose horizontal dimensions are at least as large as those of the plan view of the cabinet and oriented approximately parallel to the cabinet and under the cabinet;
   an alignment block attached near one edge of the base plate and including at least two vertical planes;
   a pivot means attached to the base plate near the edge of the base plate opposite from the edge near which the alignment block is attached;
   a socket means which mates with the pivot means, attached to the bottom surface of the cabinet near the front cabinet surface through which a laser beam passes;
   a first fixture attached to the cabinet near one side of the rear surface of the cabinet which is most remote from the cabinet end to which the socket means is attached and including an essentially vertical through threaded hole and an essentially horizontal through threaded hole;
   a second fixture attached to the cabinet near the other side of the rear surface of the cabinet which is most remote from the cabinet end to which the socket means is attached and including an essentially vertical through threaded hole and an essentially horizontal through threaded hole;
   a first vertical adjustment screw threaded through the vertical threaded hole of the first fixture, and supporting one point of the fixture from the base plate;
   a second vertical adjustment screw threaded through the vertical threaded hole of the second fixture and supporting one point of the fixture from the base plate;
   a first horizontal adjustment screw threaded through the horizontal threaded hole of the first fixture, contacting a first vertical surface of the alignment block and creating a horizontal force acting against the first fixture;

a second horizontal adjustment screw threaded through the horizontal threaded hole of the second fixture, contacting a second vertical surface of the alignment block and creating a horizontal force acting against the second fixture which is opposite to the horizontal force acting against the first fixture;

at least one essentially linear structure lying on the top of the cabinet and oriented to cross the two vertical sides of the cabinet which join the front surface and rear surface of the cabinet;

a first spring with one end anchored at the base plate and the other end attached to a first end of the essentially linear structure, pulling that end of the essentially linear structure and also the cabinet toward the base plate; and a second spring with one end anchored at the base plate and the other end attached to the second end of the essentially linear structure, pulling that end of the essentially linear structure and also the cabinet toward the base plate.

2. The assembly of claim 1 further including a second essentially linear structure on top of the cabinet oriented as the first with springs attached to its ends and the other ends of the springs anchored to the base plate.

3. The assembly of claim 1 further including lock nuts threaded onto each vertical adjustment screw and onto each horizontal adjustment screw.

4. The assembly of claim 1 wherein the base plate includes means to attach it to another surface.

5. The assembly of claim 1 wherein the pivot means is a spherical ball resting in a partial spherical socket in the base plate and the socket means is a partial spherical depression attached to the cabinet.

6. The assembly of claim 1 wherein the vertical and horizontal adjustment screws are structured to be turned without tools.

7. The assembly of claim 1 wherein the socket means, the first fixture and the second fixture are attached to the cabinet by means which do not penetrate into the interior of the cabinet.

* * * * *